United States Patent [19]

Mangold

[11] 4,334,242

[45] Jun. 8, 1982

[54] REMOTE CONTROL TELEVISION WITH EXTERNAL DATA BUS CONNECTION

[75] Inventor: Hans Mangold, Fuerth, Fed. Rep. of Germany

[73] Assignee: Grundig E.M.V., Fed. Rep. of Germany

[21] Appl. No.: 112,098

[22] Filed: Jan. 14, 1980

Related U.S. Application Data

[63] Continuation of Ser. No. 887,300, Mar. 16, 1978, abandoned.

[30] Foreign Application Priority Data

Apr. 1, 1977 [DE] Fed. Rep. of Germany ....... 2714501

[51] Int. Cl.³ .......................... H04N 5/76; H04N 5/64
[52] U.S. Cl. ................................. 358/127; 358/194.1
[58] Field of Search ............... 358/127, 194.1, 85;
179/100.11, 2 TV; 455/2, 4, 151, 154, 177, 178,
344, 352, 353, 354; 360/14; 369/19, 20, 24;
340/147 SC, 694; 364/900 MS File

[56] References Cited

U.S. PATENT DOCUMENTS

| | | | |
|---|---|---|---|
| 2,250,371 | 7/1941 | Grimes | 179/100.11 |
| 2,835,736 | 5/1958 | Sansotta | 358/194 |
| 3,534,161 | 10/1970 | Friesen et al. | 358/85 X |
| 3,731,282 | 5/1973 | Dancis et al. | 358/127 |
| 4,040,098 | 8/1977 | Beeson et al. | 360/14 |
| 4,139,865 | 2/1979 | Iida et al. | 179/100.11 |
| 4,161,728 | 7/1979 | Insam | 179/2 TV |

FOREIGN PATENT DOCUMENTS 2002995  2/1979  United Kingdom ............ 179/2 TV

OTHER PUBLICATIONS

Burth, "Remote Control With MOS IC's For TV Sets", 11/75, IEEE Tran. on Consumer Elect., vol. CE-21, No. 4, pp. 311-318.
Steckler, "Star-New Kind of TV Remote Control", 12-74, Radio Electronics, pp. 44-88.

*Primary Examiner*—Bernard Konick
*Assistant Examiner*—Donald McElheny, Jr.
*Attorney, Agent, or Firm*—Kane, Dalsimer, Kane, Sullivan and Kurucz

[57] ABSTRACT

A television receiver is provided for use as a picture display terminal for electronic peripheral equipment, where a control system with a data-bus is built into the television receiver for multitude of commands and in which the television receiver is intended to be used in addition to the normal direct reception of televised pictures for other possible applications. The television receiver can serve as a monitor for a picture tape recorder, which is equipped for recording independently of the television receiver. A complete television receiving set is provided with automatic transmitter seeking mechanism and electronic channel storage.

4 Claims, 1 Drawing Figure

REMOTE CONTROL TELEVISION WITH EXTERNAL DATA BUS CONNECTION

This is a continuation, of application Ser. No. 887,300, filed Mar. 16, 1978, now abandoned.

BACKGROUND OF THE INVENTION

Integrated circuits are presently known in the art for the convenient operation of television receivers, whereby the functions of on-off switching, channel selection, picture (video) and sound (audio) can be remotely controlled by the received telecontrol signal. In particular, the following function can be operated by such a system: Switching on and off of the equipment, calling for different program channels, variations and basic adjustments of sound level, brightness and color saturation, silencing of the sound as well as inserting of time references. With a known and presently available operating system up to 16 channels can be installed, so that it is possible, to select directly that number of programs and to tune the receiver to the appropriate channel.

Television receivers available today in many designs provide for up to 30 remotely controlled channels or channels controlled by the received signal (tele-signal) to properly operate. Additionally, infrared control is also becoming popular. These controls provide commands by means of a databus so that the operation of the various functions is possible with the provision of additional commands.

It is further known to equip peripheral equipment such as video tape recorders with a so-called electronic-tap-key rather than keys with a long throw so that all parts which are susceptable to mechanical wear are eliminated and replaced by digital controls.

It has become of interest to connect the peripheral equipment such as the video tape recorder to the television receiver so that both can be conveniently operated. With the development of new concepts simplification of design becomes critical for ease of operation and reduction of expense.

SUMMARY OF THE INVENTION

A television receiver as a picture display terminal for electronic peripheral devices wherein a remote control system with a data collector is installed for receiving a plurality of commands and in which only a portion of the commands is used for the remote control functions of the receiving and display portions of the television set, while another portion of the commands is used for adjusting the functions of an electronic peripheral device which may be coupled with a television set, and that the data collector is electrically coupled by means of an external coupling of the television set with the corresponding stages of the peripheral device.

BRIEF DESCRIPTION OF THE DRAWING

The FIGURE is a diagrammatic showing of a television receiver and electronic periphery device incorporating the invention.

DESCRIPTION OF THE PREFERRED EMBODIMENT

Figure 1:
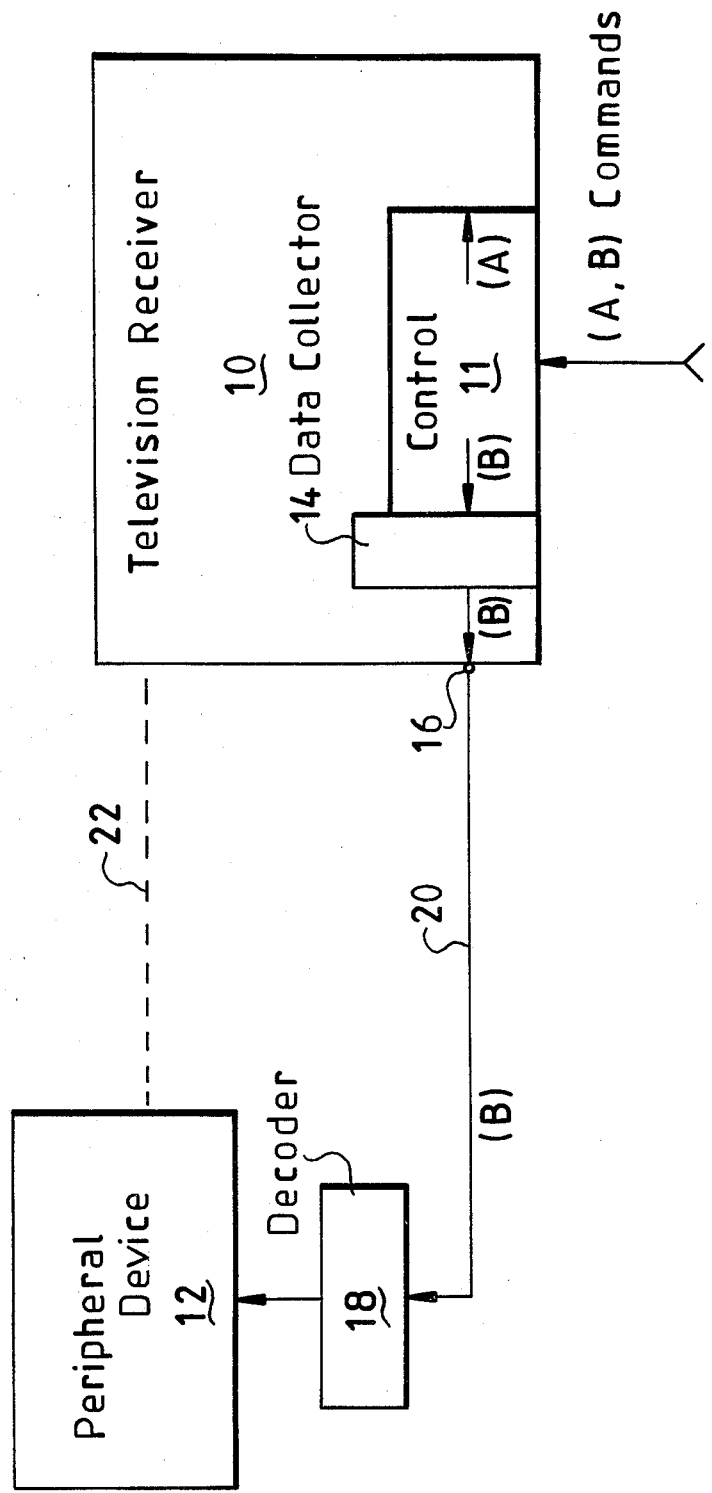

A television receiver and electronic peripheral device incorporating the invention are shown in the FIGURE. The television receiver 10 can be used as a picture display terminal for peripheral device 12. This provides the advantage, that by means of a single tele-control signal, the control of functions of the receiving and displaying sections of the television receiver can be accomplished as well as the control functions of the peripheral equipment 12, which is connected to the receiver. The peripheral device does not require a separate tele-control system since that which is already installed in the television receiver can be used. To accomplish this, portion A of the available commands A, B of the tele-control system 11 are used for the function of the television receiver 10. The remaining portion B of the available commands A, B, which is made available at databus or data collector 14 is used for the control of functions of the peripheral equipment. The databus, which is coordinated with the peripheral equipment, and which is built into the tele-control system of the television receiver, is connected electrically to external terminal 16 of the television receiver. The external terminals at television receivers and peripheral equipment are relatively inexpensive.

The primary expenses result from the necessary cable connections between the external terminals of the television receiver and the peripheral equipment, as well as the auxiliary apparatus, such as decoder 18, which decodes the data from the databus 14 and prepares it for the peripheral equipment. These expenses are reduced by simplified design, in which the connecting cables 20 and 22 together with the auxiliary apparatus or decoder 18 are combined in one component or building block. This building block can be offered as an accessory to the user of television receivers with peripheral equipment.

The invention can be used with especial advantage in connecting a television receiver with a picture tape recorder as a peripheral equipment. The picture tape recorder is equipped preferably for recording independently from the television receiver, so that the latter serves as a monitor only. With such a switching combination it is possible, for example, to accomplish this with a single control system, and by the help of a tele-control system, which is built into the television receiver, to operate the channel selection and drive mechanism control, the control for an electronic switch clock and programming of the switch commands of the picture tape recorder as well as the control of the function of the receiving and displaying unit of the receiver. In this way it is possible to use the tele-control of a television receiver additionally for the tele-control of the picture tape recorder without substantial higher expenses.

I claim:

1. A system for the use of a television receiver for external control of electronic peripheral devices, said television being of the type including a built-in integrated circuit remote control receiver, said remote control receiver being divided into two sections, one section being allocated to the remote control of the receiving and reproduction sections of the television receiver and the other section being allocated to a databus having nothing to do with the television receiver receiving and reproduction sections; an output terminal of said databus comprising an adaptor connector between said television receiver and an external peripheral device; a peripheral device external to the television receiver; cable means connecting the output of said databus with said peripheral device; and a decoder interposed between said databus output terminal and peripheral device for converting data from said databus into a form suitable for controlling functions of said peripheral device.

2. A television receiver as a picture terminal according to claim 1, in which said external coupling includes a connecting cable between the external connections of the television set and the peripheral device forming a unitary unit together with a decoder which transforms the data from the data collector into a code which directly controls the functions of the peripheral device.

3. A television receiver as a picture terminal according to claim 1 or 2, in which the peripheral device is a picture taping device which operates for recording independently from the television set which acts as a monitor.

4. A television receiver as a picture terminal according to claim 1, in which the functions controlled by said first commands include the on-off switching, picture, sound and channel selection of the television receiver and the functions controlled by said second commands include electronic program storage and changeover functions.

* * * * *